(12) United States Patent
Smith et al.

(10) Patent No.: US 7,243,457 B1
(45) Date of Patent: Jul. 17, 2007

(54) METHOD AND SYSTEM FOR SELECTING OPTIMAL FISHING EQUIPMENT

(75) Inventors: M. Scott Smith, Broken Arrow, OK (US); Richard K. Coleman, Tulsa, OK (US)

(73) Assignee: W. C. Bradley/Zebco Holdings, Inc., Tulsa, OK (US)

( * ) Notice: Subject to any disclaimer, the term of this patent is extended or adjusted under 35 U.S.C. 154(b) by 658 days.

(21) Appl. No.: 10/244,566

(22) Filed: Sep. 16, 2002

(51) Int. Cl.
*A01K 97/00* (2006.01)
*A01K 99/00* (2006.01)

(52) U.S. Cl. .............................. 43/4; 43/4.5; 206/579
(58) Field of Classification Search ................... 43/1, 43/4, 4.5, 25.2, 54.1; 206/223, 579
See application file for complete search history.

(56) References Cited

U.S. PATENT DOCUMENTS

| | | | | |
|---|---|---|---|---|
| 2,532,061 A | * | 11/1950 | Glick | 434/217 |
| 2,570,879 A | * | 10/1951 | Steel | 374/141 |
| 3,365,818 A | * | 1/1968 | Greiner | 434/247 |
| 3,786,586 A | * | 1/1974 | Swan | 43/4 |
| 3,889,860 A | * | 6/1975 | Lindsey | 294/143 |
| 3,897,157 A | * | 7/1975 | McLaughlin et al. | 356/419 |
| 4,050,179 A | * | 9/1977 | Johnson | 43/22 |
| 4,067,133 A | * | 1/1978 | Livingston | 43/17.1 CT |
| 4,445,178 A | * | 4/1984 | Scheer et al. | 700/90 |
| 4,693,028 A | * | 9/1987 | Hill | 43/4.5 |
| 4,839,675 A | * | 6/1989 | Owen | 396/429 |
| 5,397,040 A | * | 3/1995 | Lee | 224/679 |
| 5,950,352 A | * | 9/1999 | Volmer | 43/54.1 |
| 5,960,950 A | * | 10/1999 | Meeker et al. | 206/315.11 |
| 6,003,263 A | * | 12/1999 | Thurber et al. | 43/18.1 R |
| 6,131,329 A | * | 10/2000 | Kageyama | 43/42.33 |
| 6,161,323 A | * | 12/2000 | Kageyama | 43/4.5 |
| 6,250,470 B1 | * | 6/2001 | Mackenzie | 206/579 |
| 6,283,288 B1 | * | 9/2001 | Rich | 206/315.11 |
| 6,382,490 B1 | * | 5/2002 | Divincenzo | 224/681 |
| 6,393,756 B1 | * | 5/2002 | Forney et al. | 43/42.06 |
| 6,487,814 B1 | * | 12/2002 | Arredondo et al. | 43/54.1 |

FOREIGN PATENT DOCUMENTS

| | | | |
|---|---|---|---|
| FR | 2666005 | * | 2/1992 |
| GB | 2196427 | * | 4/1988 |
| JP | 10-120056 | * | 5/1998 |

(Continued)

OTHER PUBLICATIONS

'Gear by Species'. eAngler online catalog [online], 1999-2003 [retrieved Oct. 29, 2003]. Retrieved from the internet:<URL:http://www.eangler.com/pro...species.gif&pageheading=Gear+by+Species>.*

(Continued)

*Primary Examiner*—David Parsley
(74) *Attorney, Agent, or Firm*—Fellers, Snider, Blankenship, Bailey & Tippens, P.C.

(57) ABSTRACT

An equipment selecting system for assisting in selecting optimal fishing equipment for catching a desired type of fish that includes a correlating device for displaying a first reference and a second reference. The first reference is associated with a type of fish selected from a plurality of types of fish. Each fishing kit is optimized for fishing for one of the plurality of types of fish. The second reference of the correlating device is associated with a suggested one of the fishing kits. The fishing kits are preferably assembled to provide optimal equipment for a particular species of fish, as indicated by the correlating device.

10 Claims, 2 Drawing Sheets

FOREIGN PATENT DOCUMENTS

| | | | |
|---|---|---|---|
| JP | 2000-281160 | * | 10/2000 |
| JP | 2001-186969 | * | 7/2001 |

OTHER PUBLICATIONS

'eAngler 6'6" Baitcast Kit Combo'. eAngler online catalog [online], 1999-2003 [retrieved Oct. 23, 2003]. Retrieved from the internet:<URL:http://www.eanglercom/pro...ductdetail.asp?prod_id=4277&dept_id=526>.*

Translation of French patent No. 2666005 dated Feb. 28, 1992.* eangler online catalog [online], Jul. 21, 2001 [retrieved Oct. 13, 2005]. Retrieved from the internet <URL:http://web.archive.org/web/20010708080951/eangler.com/eangler/proshop/default.asp>.*

* cited by examiner

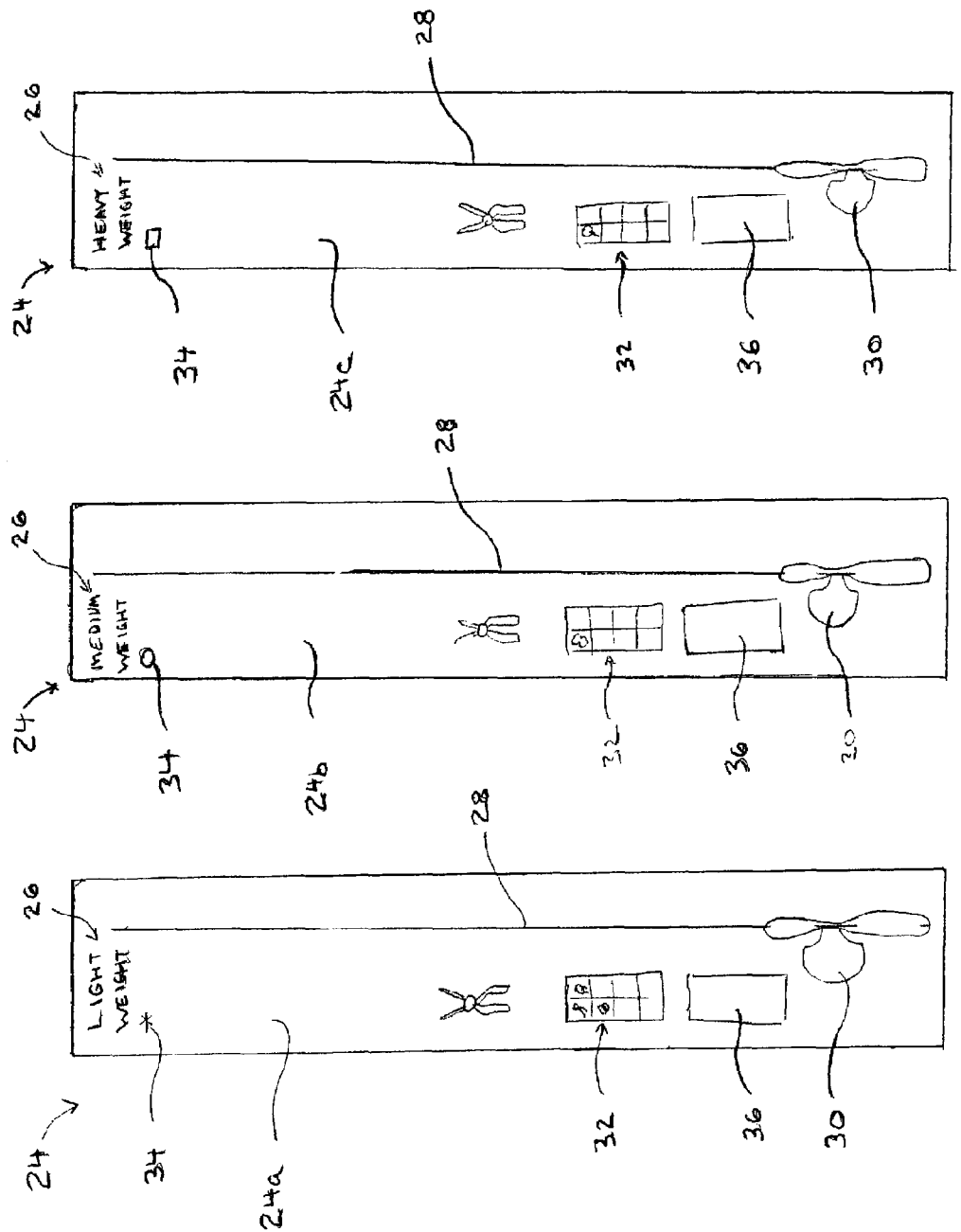

METHOD AND SYSTEM FOR SELECTING OPTIMAL FISHING EQUIPMENT

BACKGROUND OF THE INVENTION

1. Field of the Invention

This invention relates generally to fishing equipment and more particularly to a system for assisting in the selection of optimal fishing equipment for fishing for a selected type of fish.

2. Background

Recreational fishing is an activity enjoyed by a large percentage of the population. To accommodate the large number of fishermen, the fishing equipment industry provides fishing equipment including rods, reels, fishing tackle and other products in a dizzying array of types and styles, many of which are specifically adapted for catching a particular type or species of fish. For the experienced fisherman, selecting from the available choices for rod, reel and tackle add to the enjoyment of the fishing experience. However, for the novice fisherman, the wide variety of available equipment can be intimidating. Further, inappropriate equipment used to fish for a particular species can decrease the likelihood of catching fish and will result in decreased enjoyment of the fishing experience. Additionally, even for an experienced fisherman, purchasing all of the required gear can be time consuming.

Therefore, it is desirable to provide a fishing system wherein a user can quickly and easily determine which of several pre-packaged fishing kits contain equipment that is optimal for fishing for a particular species of fish. Each of the pre-packaged fishing kits ideally contain all of the necessary equipment, selected and packaged for fishing for a particular species of fish. By providing such a system, even a novice fisherman can obtain a measure of confidence heretofore unobtainable that he or she is fishing with the correct and optimal equipment for a particular species of fish. Additionally, it is desirable to provide a packaged fishing kit having a rod, reel, and tackle contained therein for enabling a fisherman to quickly purchase all of the required fishing equipment.

SUMMARY OF THE INVENTION

An equipment selecting system is provided for assisting in selecting optimal fishing equipment for catching a desired type of fish. The system includes a correlating device that displays a first reference and a second reference, wherein the first reference is associated with a type of fish selected from a plurality of types of fish. At least two fishing kits are provided, each optimized for fishing for one of the plurality of types of fish. The second reference of the correlating device is associated with a suggested one of the fishing kits.

In a preferred embodiment, the correlating device has a display component having a first display and a second display. The correlating device additionally has a data component that provides data related to a plurality of types of fish and data related to the fishing kits. In one embodiment, the data related to the type of fish is visible in the first display and the data related to the suggested fishing kits is visible in the second display of the correlating device. Examples of types of fish contemplated for use with the system include trout, panfish, bass, walleye, catfish, in-shore saltwater fish and big-water saltwater fish.

The fishing kits are preferably assembled to provide optimal equipment for a particular species of fish, as indicated by the correlating device explained above. Examples of fishing kits include a light weight kit having equipment optimized for trout and panfish, a medium weight fishing kit having equipment optimized for bass and walleye; and a heavy weight fishing kit optimized for catfish, in-shore saltwater fish and big-water saltwater fish. General purpose fishing kits may also be desirable for providing a fisherman a convenient source for all of his or her fishing equipment.

In a preferred embodiment, the fishing kits have a label correlated with a species or group of species of fish. Alternatively, the fishing kits may be correlated with other categories of fish including categories by weight, fishing location, water depth, etc. To assist a prospective purchaser, the label of the fishing kit should provide a reference that correlates with the second reference of the correlating device. The second reference may be a color, script, a design, or other reference that may be easily identified by the prospective purchaser. Preferably, the fishing kits of the invention include a rod and reel having characteristics that are optimal for fishing for a selected type of fish. A fishing kit also preferably contains fishing tackle having characteristics that are optimal for fishing for a selected type of fish.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIGS. 2A-C are schematic diagrams of example fishing kits of the invention.

DETAILED DESCRIPTION OF THE PREFERRED EMBODIMENT

Figure 1:
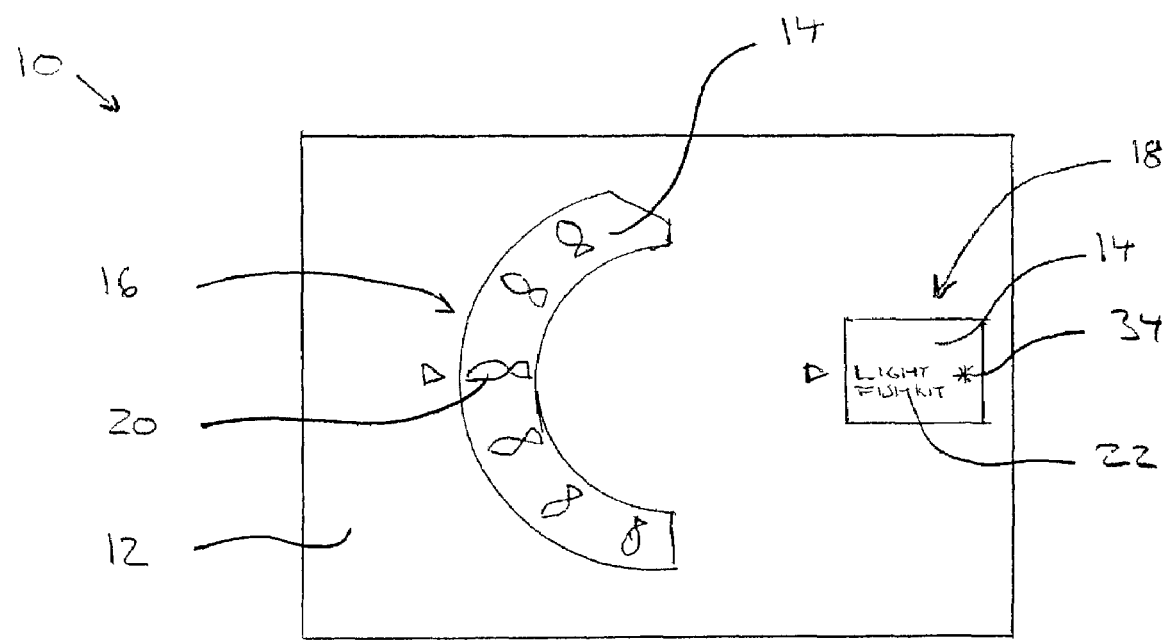
FIG. 1 is a schematic diagram of a correlating device.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to FIGS. 1 and 2, an equipment selecting system for assisting a fisherman in selecting optimal fishing equipment for a particular type of fish is shown. Referring first in particular to FIG. 1, a correlating device 10 is shown. Correlating device 10 preferably has a display component 12 and a data component 14. Display component 12 may be provided with a first display 16 and a second display 18. Preferably, first display 16 allows a user to view a first reference 20. First reference 20 preferably includes data related to a plurality of types of fish. Second display 18 allows a user to view a second reference 22. Second reference 22 preferably includes data related to a plurality of types of fishing kits 24 (FIGS. 2A-C). Examples of types of fish referred to by first reference 22 include trout, panfish, bass, walleye, catfish, in-shore saltwater fish and big-water saltwater fish.

Referring now to FIGS. 2A-C, the equipment selecting system of the invention further includes at least two fishing kits designated generally 24. Each fishing kit 24 is optimized to include equipment for fishing for one of the plurality of types of fish. For example, fishing kit 24 may be provided in three embodiments including a lightweight kit 24*a*, a medium-weight kit 24*b*, and a heavy-weight kit 24*c*. Preferably, each fishing kit 24 includes a label 26 that corresponds with second reference 22. Fishing kit 24 additionally includes a rod 28 and reel 30 having characteristics that are optimal for fishing for a selected type of fish. Fishing kit 24 further includes fishing tackle 32 that has characteristics that are optimal for fishing for the selected type of fish. Other equipment that may be included in fishing kit 24 are tackle box 36 and pliers 38. Additional equipment may also be desirable.

An example configuration of correlating device 10 includes a configuration wherein data component 14 is rotatably mounted within display component 12. Data component 14 is rotated to select a first reference 20 indicating a type of fish that is trout or panfish. When the correlating device 10 displays a first reference 20 indicating trout or panfish, the correlating device 10 then displays a second reference 22 visible in second display 18. Second reference 22 indicates that an optimal fishing kit 24 is lightweight kit 24*a* (FIG. 2*a*). Second display 18 may include script, a design 34, a color or other type of display.

As a further example the equipment selecting system may be configured such that when a type of fish selected from data component 14 is catfish, then the correlating device 10 displays a first reference 20 indicating catfish. The correlating device 10 then displays data related to fishing kit 24 as a second reference 22. Second reference 22 indicates that the optimal fishing kit 24 for catching catfish is a heavy-weight kit 24*c* (FIG. 2*c*).

As yet another example, the equipment selecting system of the invention may be configured in such a way that when a type of fish selected from data component 14 is bass, correlating device 10 displays a first reference 20 indicating bass. Correlating device 10 then displays a second reference 22 indicating that the optimal fish kit 24 for catching bass is a medium-weight kit 24*b* (FIG. 2*b*).

Correlating device 10 may be provided in forms other than the wheeled design having a display component 12 and a data component 14, as discussed above. For example, correlating device 10 may be an electronic device wherein display component 12 is a display screen and data component 14 is computer memory. Other embodiments that correlate a selected type of fish and a suggested fish kit are contemplated to fall within the scope of the invention.

In practice, a method for selecting fishing equipment for catching a desired type of fish includes manipulating the data component 14 of correlating device 10 to select first reference 20 associated with a selected type of fish. A second reference 22, visible in second display 18, suggests which of several fishing kits 24 is optimal for fishing for the selected type of fish. Once the optimal fishing kit 24 has been determined, the fishing kit 24 may be selected by referencing a label 26 on a fishing kit 24. The label 26 may include indicia corresponding to the second reference 22, a color that corresponds with the second reference, and/or a design 34 that corresponds with the second reference 22.

By selecting an appropriate fishing kit 24, the user automatically obtains a rod 28 and reel 30 having characteristics that are optimal for fishing for a selected type of fish. Additionally, optimal fishing tackle 32 having characteristics that are optimal for fishing for a selected type of fish are included therein.

The system of the invention provides an easily accessible prepackaged fishing kit and an easily accessible method of determining which type of fishing kit should be selected. Therefore, a user may quickly and easily obtain the optimal equipment for fishing without having to draw on extensive fishing experience and/or without having to conduct research to guide the user in selecting the appropriate equipment.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. An equipment selecting system for assisting in selecting optimal fishing equipment for catching a desired type of fish comprising:

a correlating device displaying a first reference and a second reference, wherein said first reference is adapted to indicate a type of fish selected from a plurality of types of fish;

a plurality of prepackaged fishing kits, each optimized for fishing for one of said plurality of types of fish;

a label affixed to each of said prepackaged fishing kits;

wherein said second reference is adapted to match up with said label on one of said plurality of prepackaged fishing kits that are optimized for fishing for said type of fish selected from said plurality of types of fish; and wherein said prepackaged fishing kits comprise a rod, reel and tackle.

2. The equipment selecting system according to claim 1 wherein said correlating device comprises:

a display component having a first display and a second display;

a data component having a listing of said plurality of types of fish for facilitating a selection of one of said plurality of types of fish, said data component further having data related to said plurality of prepackaged fishing kits; and wherein said listing of said plurality of types of fish is visible in said first display and said data related to said plurality of fishing kits is visible in said second display.

3. The equipment selecting system according to claim 1 wherein:

said a plurality of types of fish comprise trout, panfish, bass, and catfish.

4. The equipment selecting system according to claim 1 wherein said plurality of prepackaged fishing kits comprise:

a first fishing kit comprising a light weight kit having equipment optimized for catching fish selected from a group consisting of trout and panfish;

a second fishing kit comprising a heavy weight kit having equipment optimized for catching fish selected from a group consisting of catfish, in-shore saltwater fish and big-water saltwater fish; and a third fishing kit comprising a medium weight kit having equipment optimized for catching fish selected from a group consisting of bass and walleye.

5. The equipment selecting system according to claim 1 wherein:

said label refers to said second reference; and wherein said second reference comprises a first color; and said label comprises said first color.

6. The equipment selecting system according to claim 1 wherein:

said label refers to said second reference; and wherein said second reference comprises a first design; and said label comprises said first design.

7. A method of selecting fishing equipment for catching a desired type of fish comprising the steps of:

manipulating a correlating device to display a first reference adapted to indicate a selected type of fish and a second reference adapted to match up with a label on a prepackaged fishing kit optimized for fishing for the selected type of fish;

matching said second reference with said label on said prepackaged fishing kit optimized for fishing for the selected type of fish;

selecting the fishing kit indicated by said second reference, said prepackaged fishing kit comprising:

a rod having characteristics that are optimal for fishing for said selected type of fish;

a reel having characteristics that are optimal for fishing for said selected type of fish; and fishing tackle having characteristics that are optimal for fishing for said selected type of fish.

8. The method according to claim 7 wherein said step of determining comprises:

comparing a color of said second reference to a matching color on said label of said fishing kit for correlating said selected type of fish with said one of several fishing kits.

9. The method according to claim 7 wherein said step of matching comprises:

comparing a design of said second reference to a matching design on said label of said prepackaged fishing kit for correlating said selected type of fish with said one of several fishing kits.

10. The method according to claim 7 wherein said step of selecting the fishing kit comprises:

selecting from a first fishing kit comprising a light weight kit;

a second fishing kit comprising a heavy weight kit; and a third fishing kit comprising a medium weight kit.

* * * * *